Sheet 1, 2 Sheets.

B. H. Jenks.

Shuttle Motion.

No. 312. Reissued Jun. 5, 1855.

Witnesses;
by Sunday
J. E. Grant.

Inventor;
Barton H. Jenks

N. PETERS, PHOTO-LITHOGRAPHER, WASHINGTON, D. C.

Sheet 2, 2 Sheets.

B. H. Jenks.

Shuttle Motion.

No. 312. Reissued Jun. 5, 1855.

Witnesses;
Geo Harding
J. E. Shaw.

Inventor;
Barton H. Jenks.

N. PETERS, PHOTO-LITHOGRAPHER, WASHINGTON, D. C.

UNITED STATES PATENT OFFICE.

BARTON H. JENKS, OF BRIDESBURG, PENNSYLVANIA.

IMPROVEMENT IN LOOMS.

Specification forming part of Letters Patent No. 12,630, dated April 3, 1855; antedated January 8, 1855; Reissue No. 312, dated June 5, 1855.

*To all whom it may concern:*

Be it known that I, BARTON H. JENKS, of Bridesburg, in the county of Philadelphia and State of Pennsylvania, have invented certain new and useful Improvements in Looms, of which the following is a full, clear, and exact description, reference being had to the accompanying drawings, which make part of this specification, and in which—

Figure 1:
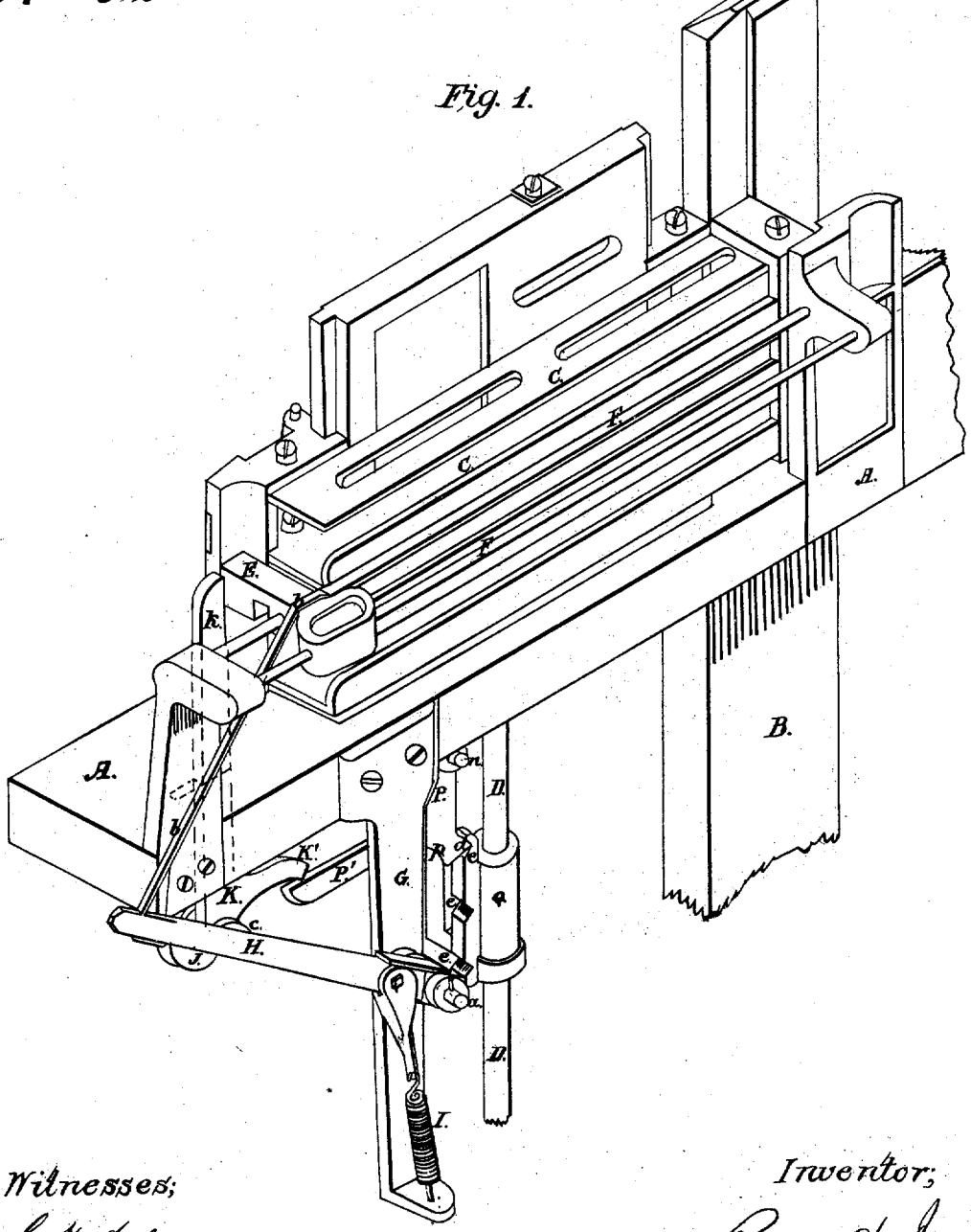
Figure 2:
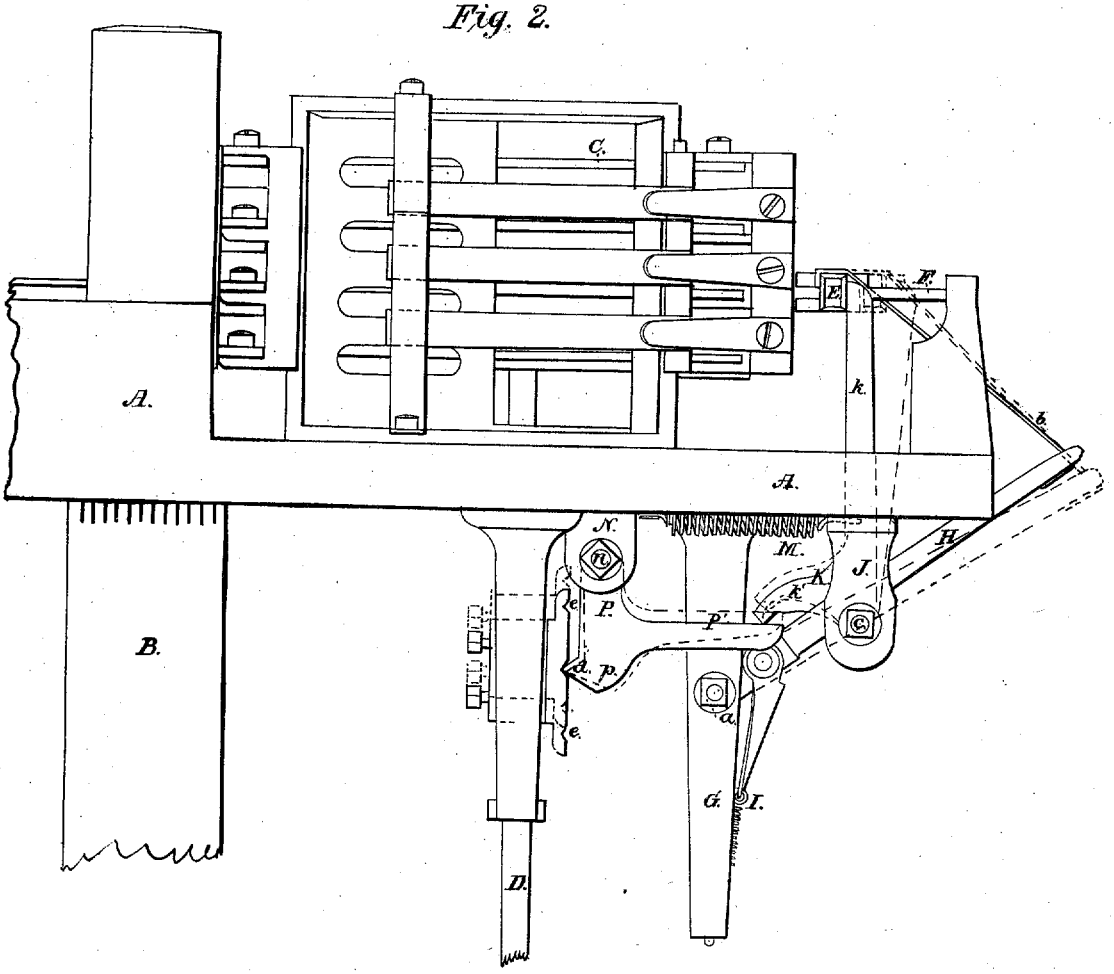

Figure 1 represents an isometrical view of a portion of the left end of the lay of the loom and so much of the mechanism connected therewith as is necessary to show the application of my improvements thereto; and Fig. 2 represents an elevation of the rear side of the same, showing the shuttle-boxes lifted a shelf higher than they appear in the view shown by Fig. 1.

In looms constructed as heretofore the picker is very liable to be broken by the momentum with which the shuttle strikes it. With a view to remedy this defect, and also to prevent the thread from being jarred off the cap and entangled, I have arranged a spring-lever a little beyond the outer end of the shuttle-box for the picker to rest against, so that the momentum of the shuttle may be arrested gradually, and thus avoid the sudden blow or percussion with which the shuttle impinges upon the picker when held firmly and rigidly, as in other looms.

The mechanism for relieving or freeing the picker from the shuttle by a positive motion, as heretofore patented by me, I have found to be, although very useful, not quite as durable and certain in its action as is desirable in consequence of the motion being transmitted from the treadles to the shuttle through the intervention of a strap, which is liable to stretch so as to require frequent adjustment. To avoid this difficulty I have contrived an arrangement of levers on the end of the lay, which, in combination with a series of cams on the rod by which the shuttle-boxes are lifted, so operates as to free the picker from the end of the shuttle preparatory to moving the boxes.

In order to insure the prompt detachment of the picker from the end of the shuttle when the rest is withdrawn, I combine the picker, by means of a string, link, or otherwise, with a spring-lever, which constantly tends to draw the picker toward the outer end of the lay.

In the accompanying drawings a portion of the left end of the lay A is shown; also a piece of the sword B, on which the end of the lay is supported; likewise a series of shifting shuttle-boxes, C, and the lifting-rod D, by which the shuttle-boxes are raised and depressed; also, the picker E and the spindles or rods F on which it slides.

As mechanism for raising and lowering shuttle-boxes, the picker-stick and other mechanism connected with the picking motion are well known, and fully described in my former patents, I propose to omit all description of the same in the present application as superfluous, except in so far as it may be necessary to refer to them in describing my present improvements. On the front end of the lay A a bracket, G, is secured, which extends downward. About the middle of this bracket the lower end of a lever, H, is secured by a pivot, *a*, and a spring, I, extends from near the lower end of this lever to the lower end of the bracket, and the spring thus arranged constantly tends to turn the lever outward. The upper extremity of the lever is connected, by a strap or cord, *b*, with the picker E, so that the latter shall constantly be pulled outward by the same force which tends to turn the upper end of the lever H in the same direction. A bracket, J, is attached to the under side of the lay and extends downward. To the lower part of this bracket an elbow or two arm lever, K, is held by a pivot, *c*, on which the lever turns. The upright and longest arm of the lever passes through a mortise or opening in the lay and extends up to a level with the top of the picker, or slightly beyond it, in order that the latter may rest against it, and thereby be limited in its outward motion. The horizontal arm of this lever K extends inward and rests upon the horizontal arm P P′ of a lever, P. The vertical arm *k* of the lever K is constantly drawn inward by a spring, M, which is connected to it at one end, and at the other to the under side of the lay. Another bracket, N, projecting downward from the under side of the lay, supports the lever P, which is connected with it by a pivot, *n*. The lower vertical arm of this lever is provided with an obtuse wedge, *d*, projecting from its inner edge. This wedge enters notches *e*, of corresponding shape, on the side of a sleeve, Q, on the lifting-rod D. The sleeve Q is attached to the lifting-rod, and has a longitudinal rib on it, and as many obtuse-angled notches in it as there are shuttle-boxes, and at the same distance apart respectively as the shelves of the same. Under this arrangement whenever the shuttle-boxes are lifted by the rod D, the movement of the sleeve up or down will force the wedge of the arm out of the notch in which it may be. At the commencement of this movement of the shuttle-box the wedge will be forced out of the notch and so held by the rib between the notches until the box is changed to the required position to present another shuttle to the action of the picker, when the wedge will drop into another notch, being forced therein by the pressure of the sponge M acting through the lever K upon the lever P. When the wedge *d* is forced out of the notches, the lower vertical arm, *p*, of the lever P is moved outward. This raises the horizontal arm P′, and that in turn raises the horizontal arm K′ of the lever K, which moves the upper end of the arm *k* outward, thus permitting the spring-lever H to draw the picker outward far enough to disengage it from the outer end of the shuttle, as shown by red lines in Fig. 2. The lever or rest is so arranged as to receive the blow of the picker and yield without disturbing the position or action of the other lever, P, which transmits motion from the notched rib to effect the separation of the picker from the shuttle at the proper time.

It will be observed that the tendency of the spring-lever H is constantly to force the picker against its rest, while the tendency of the latter is to press against the picker; but the force with which the yielding rest presses inward must be so much greater than that which causes the picker to press outward as to overcome it readily, otherwise the picker would not be returned after having been forced to its outermost position by the momentum of the shuttle. A very slight play is required in the lever K when struck by the picker, and it is obvious that this play may be obtained by the natural elasticity of the lever and of the joints; or the spring M may be dispensed with and the yielding motion given to the lever K at the proper interval by means of a cam or treadle or its equivalent in the loom, and in that case the lever K would be moved in and out by every revolution of the crank-shaft.

What I claim as my invention, and desire to secure by Letters Patent, is—

1. The yielding rest or support K for the picker, arranged, substantially as described, to break the sudden blow or concussion with which the shuttle impinges upon the picker, thereby preventing the filling of the cap from being jarred off and entangled and relieving the picker from danger of being broken.

2. Separating or freeing the lever K and the picker from the end of the shuttle by the same movement which shifts the shuttle-boxes operating through a combination of levers, cams, and springs, substantially as herein set forth, or through levers, cams, or treadles worked from any part of the loom.

BARTON H. JENKS.

Witnesses:
J. E. SHAW,
GEORGE HARDING.